United States Patent [19]
Pekau et al.

[11] 3,809,455
[45] May 7, 1974

[54] COUPLING DEVICE FOR OPTICAL WAVE GUIDES

[75] Inventors: Dietlind Pekau, Krailling; Horst Kiemle, Munich, both of Germany

[73] Assignee: Siemens Aktiengesellschaft, Berlin & Munich, Germany

[22] Filed: Sept. 22, 1972

[21] Appl. No.: 291,271

[30] Foreign Application Priority Data
Sept. 24, 1971 Germany............................ 2147841

[52] U.S. Cl............................. 350/96 WG, 350/96 R
[51] Int. Cl. .............................................. G02b 5/14
[58] Field of Search ................... 350/96 WG, 162 R

[56] References Cited
UNITED STATES PATENTS
| | | | |
|---|---|---|---|
| 3,674,335 | 7/1972 | Ashkin et al. | 350/96 WG |
| 3,674,336 | 7/1972 | Kogelnik | 350/96 WG |
| 3,631,360 | 12/1971 | Lehovec | 350/96 WG UX |

OTHER PUBLICATIONS
Pennington et al., "Fast Wave Optical Guide Couplers Using Holographic Elements," IBM Technical Disclosure Bulletin, Vol. 13, No. 8, January 1971, pp. 2,280–2,281.

*Primary Examiner*—John K. Corbin
*Attorney, Agent, or Firm*—Hill, Sherman, Meroni, Gross & Simpson

[57] ABSTRACT

A device for optically coupling a dielectric optical wave guide to another optical device such as a detector, a laser or light amplifier characterized by a coupling element having either a refraction index or surface relief structure which is arranged as a layer extending circumferentially around the surface of the wave guide adjacent one end, and an optical component, such as an axicon, kinoform, a phase hologram or a volume hologram, having an axis of rotational symmetry which is arranged coaxially with the axis of the wave guide between the end and the optical device. To produce the device, the layer is applied on the wave guide and treated by exposing with an amplitude modulated light beam or an intensity modulated electron beam. After completing the treating by developing and fixing the exposed layer, an optical component is arranged on the desired position between the end of the wave guide and the optical device.

12 Claims, 6 Drawing Figures

COUPLING DEVICE FOR OPTICAL WAVE GUIDES

BACKGROUND OF THE INVENTION

1. Field of the Invention

The present invention is directed to a device and method of making the device for either coupling light with a dielectric optical wave guide or decoupling light from an optical wave guide with an optimum mode matching and with a given light distribution.

2. Prior Art

With optic information transmission system using light-guiding fibers, light pulses with different pulse width and pulse distances are usually guided from a transmission station to a receiving station. Light pulses which are generated by a laser oscillator at the transmission station are usually coupled into light guiding fibers which have a diameter of a few $\mu$m. From the light-guiding fibers the light pulses are coupled onto a photo detector at the receiving station. If light amplifiers are required, intermediate stations are provided and require further coupling arrangements. Each of these coupling arrangements is supposed to guide an optimum amount of light from one material to the next.

If the light emerging freely from one material is imaged on the following material via optical lenses, faulty matching will occur. This mismatch is due to the characteristic field distributions of the modes in the wave guide and usually causes high power losses.

An improved optical coupling arrangement can be provided by placing holograms between an output element and wave guiding elements. The holograms can be selected in such a way that a mode adaption is created.

An arrangement for coupling has been suggested in which a hologram is arranged as a coupling device at the end surface of the light guiding fiber, to create both a cross-sectional matching and a mode matching of light for the next element.

Since the end surface of the light-guiding fibers, which are supposed to be coupled in this manner, are very small, the production of the hologram structure and the positioning of the hologram at the end of the light-guiding fiber are very costly processes requiring extensive adjustments. Furthermore, the cut end surface of the conductor will produce reflections for the modes of the light which are supposed to be coupled in the wave guide.

SUMMARY OF THE INVENTION

The present invention provides a very effective coupling arrangement or device which can be constructed by a method requiring only simple adjusting device or equipment. The device for providing a coupling between an optical device and optical wave guide utilizes a component arranged between an end of the fiber and optical device and a coupling element which is a layer extending circumferentially around the optical wave guide adjacent the end. The optical component distributes the light evenly on the layer which has either a refraction index variation or surface structure to produce optimum matching of the light being received in the fiber optic. The layer of the coupling element has a relatively large surface to provide the mode matching and directional distribution of the light being received by the wave guide. Preferably the optical component is either an axicon, kinoform, a phase hologram or volume hologram and the layer is a kinoform. To form the coupling, the layer is applied to the wave guide and treated by exposing with either an amplitude-modulated light beam or intensity-modulated electron beam. After exposing, the layer is developed and fixed to complete the treatment and the optical component is arranged at the desired position between the end of the fiber and the optical device. To modulate the radiation such as light radiation, a mask is used and if the light is coherent light and the mask is either a hologram or kinoform a three dimension exposure is produced on the coated fiber. When using incoherent light or the electron beam, the path of the beam and fiber are relatively rotated either continuously or in sequential steps.

DESCRIPTION OF THE PREFERRED EMBODIMENTS

Figure 1:
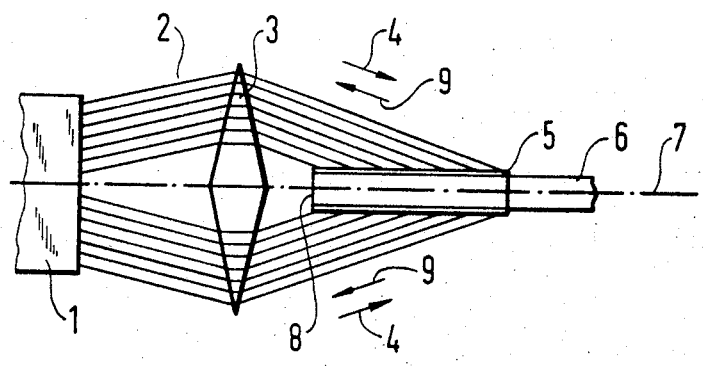
FIG. 1 illustrates an embodiment of the coupling device of the present invention.

The principles of the present invention are particularly useful in a device, illustrated in FIG. 1, for coupling light from an optical device such as a laser oscillator 1 to a dielectric optical wave guide such as light-guiding fiber 6, or in the opposite direction. Light pulses 2 leaving an end surface of the laser 1 are received by an optical component 3 and directed onto a coupling element 5 which is a layer extending circumferentially around an outer surface of the wave guide adjacent an end 8.

The optical component 3 is illustrated as an axicon which is a transparent member having a shape of a prism rotated about an axis and thus has an axis of rotational symmetry. The axicon is arranged with its axis of symmetry on the axis of the laser 1 and preferably coaxial with the optical axis 7 of the wave guide 6. The axicon 3 will direct the light pulse 2 having a cross-section of the radiation with constant radiation intensity in the direction of arrow 4 with an even distribution onto the surface of layer 5.

The layer 5 has a structure to couple the pulses with a low number of modes and preferably a mode in the direction of the optical axis 7 into the wave guide 6. The structure of layer 5 can be either due to the variable refraction index structure of the material or a surface relief of the layer. Since light waves or pulses having only lower modes are less dampened in the wave guide, the effective coupling of one or several modes, while neglecting the higher modes, is of a particular advantage and the transmitted pulses are only slightly distorted.

If a phase hologram, volume hologram or kinoform is used as the optical component 3 instead of the axicon, the component 3 will contribute to the mode matching of the wave guide regardless of the spacial distribution of the higher order wave. The phase hologram, volume hologram and kinoform are each preferably provided with rotational symmetry about an axis and are arranged with its axis of symmetry aligned with the axis of the optical device such as laser 1 and the axis 7 of the wave guide 6.

If the layer 5 is a kinoform, it will beside provide coupling of light being received by the optical wave guide 6 from the laser 1, also provide a decoupling for light leaving the wave guide 6 and being received by an optical device 1 which may be a photo detector or an amplifier. In the case of decoupling, the light being guided in the wave guide 6 toward end surface 8 is coupled out of the fiber by coupling element 5 and directed as indicated by arrow 9 to the optical component 3. From component 3, the light is directed and concentrated on the surface of optical device 1 such as a detection surface of a photo detector to provide an increased output signal.

Figure 2:
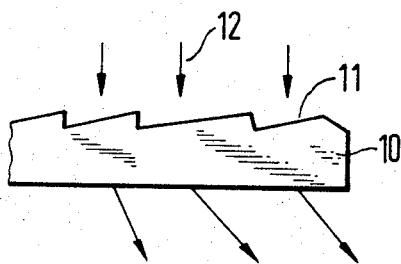
FIG. 2 illustrates a cross-section of a kinoform.

A kinoform mentioned hereinabove is a layer shaped device such as layer 10 (FIG. 2) for producing a given wave front. A light beam directed on a kinoform is diffracted in a single diffraction order due to the surface structure having a lattice or grating like configuration. Depending on the configuration of the surface structure or surface relief, the kinoform can transmit individual beams as well as mode types in predetermined transmission directions. A partial cross-section of a kinoform which can be used as layer 5 or component 3 is illustrated in FIG. 2. The kinoform comprises a thin layer 10 of transparent material having a surface relief or configuration 11 and it may also have a refractive index structure. The surface structure 11 has a sawtooth configuration with sharp edges that produce a diffraction grating or lattice. Light beams 12 directed onto the surface 11 are diffracted according to the "grating constant" in different diffraction directions. Due to the phase difference occurring during the passage of the light beams, through the layer 10, a certain type of mode is transformed into another certain type of mode. While taking into account the thickness of the material of the layer 10, the height and width of the steps of the surface 11 and the wave length of the light 12, certain propagation directions of the light permeating the kinoform will occur and in this sense a transformation occurs.

Figure 3:
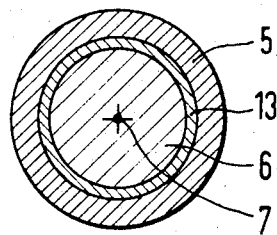
FIG. 3 is a cross-section of a wave guide with an embodiment of the coupling layer.

If the layer 5 has a refractive index which is lower than the refractive index of the wave guide 6, the wave guide will guide light waves or pulses along its interior and has surface waves, and the fiber will have a small dampening due to radiation losses. If the refractive index of the layer 5 is equal to or greater than the refractive index of the wave guide, one of more intermediate layers 13 having a refractive index lower than the refractive index of the guide 6 is interposed between the outer layer 5 and wave guide 6 (FIG. 3). The intermediate layer 13 should be selected with a thickness of a few wave lengths or less of the light which is being transmitted by the fiber. When the layer 5 has a refractive index less than the refractive index of the wave guide, the intermediate layers 13 are not required.

In operation a light wave or pulse directed radially onto the layer 5, which is a kinoform, at an angle with respect to the axis 7 is coupled into the wave guide and guided in the direction of the optical axis 7. In exactly the same manner, a light wave guide of along the optical axis 7 toward end 8 will be directed outwardly through the layer when it enters the portion of the wave guide provided with layer 5.

To produce the device, a material such as photoresist layer or a dichromate-gelatin layer is circumferentially coated on the surface of the wave guide 7 adjacent one end. The layer is then treated by exposing with modulated radiation and then developing and fixing the exposed layer to produce the structure such as the refractive index or the surface relief. To complete the coupling device, the optical component 3 is coaxially arranged between the device 1 and end 8 of wave guide 6 with the distance from end 8 being dependent on the beam deflection characteristics of the component 3.

Figure 4:
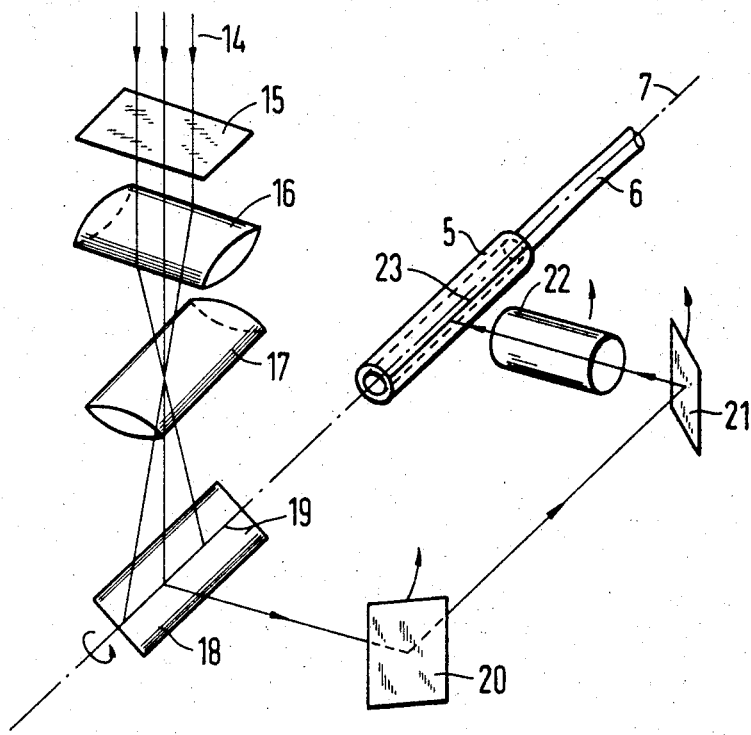
FIG. 4 is a schematic illustration of apparatus for performing the method of forming the device.

The exposing of the layer 5 can be accomplished using an apparatus such as illustrated in FIG. 4. A beam 14 of parallel light rays is directed vertically onto a mask 15, which contains the image of the structure which is to be projected onto the layer 5. The beam of light modulated by the mask is received by a cylindrical lens 16, and directed to a second cylindrical lens 17 which is arranged at the focal point of the lens 16 with its axis arranged perpendicular to the axis of the lens 16. By using cylindrical lens 16 and 17, the beam of light is always focused on certain parallel planes. The beam of light is directed by lens 17 onto a mirror 18 which is mounted for rotation around an axis 19 which coincides with the optical axis 7. The mirror 18 reflects the beam of light to a mirror 20 which reflects the beam to a mirror 21 that reflects the beam to microscopic objective 22 which directs the beam on the layer 5. The image of the mask 15 is recorded on the layer 5 along a line or strip 23 by this arrangement. In order to record the image on the entire surface of the layer 5, the mirrors 18, 20 and 21 and the microscope objective 22 must be rotated around the optical axis 7. Instead of rotating these mirros and the microscope objective, they may be mounted in a fixed position and the wave conductor 6 with layer 5 may be rotated around the optical axis 7 to provide the necessary relative rotation. The rotation may either be in sequential steps or continuous. During the production of the layer, there is a possibility to make corrections for possible aberrations of the incident wave front and for non-linearities of the layer material. Such a correcting effect in the layer can be produced when the image is suitably provided by the pattern.

The mask 15 may be a photograph slide and the beam 14 of light rays may be an incoherent beam of light which is amplitude modulated by the mask 15. If either a hologram or a kinoform is used as the mask and the beam is a beam of coherent radiation, a three dimensional image will be produced and can be adapted to the surface of the layer which is to be exposed.

Figure 5:
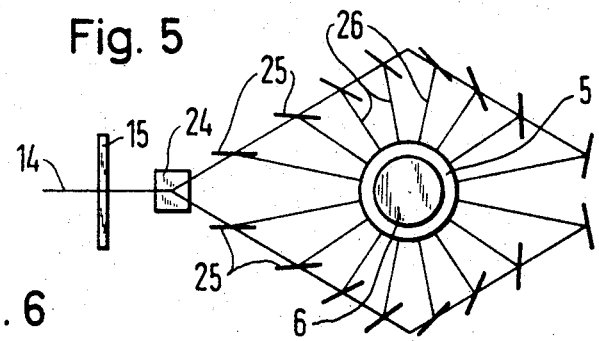
FIG. 5 is a schematic illustration of another apparatus for performing the method of forming the device.
Figure 6:
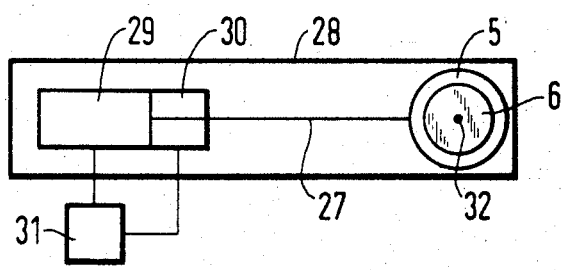
FIG. 6 is a schematic illustration of an apparatus for performing an embodiment of the method of forming the device.

Another embodiment of an arrangement for exposing the layer prior to being developed and fixed is illustrated in FIG. 5. The beam 14 is directed on the pattern 15 and is directed by a beam disecting device 24 into two partial beams of equal intensity. Each of the partial beams is subdivided by a plurality of partially permeable mirrors 25 into partial beams 26 which are reflected by their respective mirrors 25 onto the layer from different directions. The partial permeability of the mirror 25 is selected in such a way that the radiation intensity of the partial beam 26 is constant. If adjacent beams 26 bearly touch at the surface of the layers, the layer will be completely exposed without requiring any relative movement between the layer and apparatus.

Instead of using light as the amplitude modulated radiation, an intensity modulated electron beam 27 can be used as the radiation for exposing the layer. A device or system 29 such as a triode is positioned in an evacuated housing 28 which includes a deflection coil 30 for deflecting the beam 27 in a direction extending along the axis 32 of the wave guide 6. The structure of the layer 5 is created by exposing with the intensity modulated electron means 27 which modulation is controlled by an intensity modulator 31 as a function of the deflecting direction and amount provided by coil 30. In order to expose the entire surface of the layer 5, the wave guide and layer are rotated step-by-step around the axis 32.

When using either the electron beam or the beam of light, the modulation by the modulation 31 or the mask 15 respectively is determined in such a way to produce the structure of the layer which structure produces the device mode and direction for the light pulse being coupled between the layer and wave guide in either direction.

Although various minor modifications might be suggested by those versed in the art, it should be understood that we wish to employ within the scope of the patent granted hereon all such modifications as reasonably, and properly come within the scope of our contribution to the art.

We claim:

1. A device for coupling light from an optical device into a cylindrical dielectric optical wave guide and for coupling light from the wave guide into the optical device comprising a coupling element having a structure for producing a single diffraction order of light received thereby and being a kinoform, said coupling element being a layer extending circumferentially around the outer surface of the cylindrical wave guide adjacent one end thereof, and an optical component having an axis of rotational symmetry, said optical component being disposed between said one end of the wave guide and the optical device and being coaxial with the wave guide, said optical component distributing the light waves received from the surface of the optical device evenly on the layer of said coupling element and distributing the light waves received from the coupling element evenly onto the surface of the optical device so that the light waves of at least one optimum mode matching light distribution are guided between the light wave guide and the optical device in either direction.

2. A device according to claim 1, wherein the structure is the refractive index variation of the layer.

3. A device according to claim 1, wherein the structure is a surface relief structure of the layer.

4. A device according to claim 1, wherein the layer comprises a material having a lower refractive index than the material of the wave guide.

5. A device according to claim 1, wherein the layer consists of a material having a refractive index equal to or greater than the refractive index of the material of the wave guide, and wherein at least one transparent intermediate layer is disposed between the first mentioned layer and the wave guide, said intermediate layer having a thickness in the order of a wave length of the light being guided therethrough and having a refractive index less than the refractive index of the material of the wave guide.

6. A device according to claim 1, wherein the layer is a photo resist layer.

7. A device according to claim 1, wherein the layer is a dichromate gelatin layer.

8. A device according to claim 1, wherein the optical component is a phase hologram.

9. A device according to claim 1, wherein the optical component is a volume hologram.

10. A device according to claim 1, wherein the optical component is an axicon.

11. A device according to claim 1, wherein the optical component is a kinoform.

12. A device according to claim 1, wherein the optical component has structure to transmit light of a given mode with the light intensity being evenly distributed to a far degree.

* * * * *